United States Patent [19]
Kidode et al.

[11] Patent Number: 4,573,191
[45] Date of Patent: Feb. 25, 1986

[54] STEREOSCOPIC VISION SYSTEM

[75] Inventors: Masatsugu Kidode, Yokohama; Yoshinori Kuno, Kawasaki, both of Japan

[73] Assignee: Tokyo Shibaura Denki Kabushiki Kaisha, Kawasaki, Japan

[21] Appl. No.: 594,733

[22] Filed: Mar. 29, 1984

[30] Foreign Application Priority Data

Mar. 31, 1983 [JP] Japan .................................. 58-56071

[51] Int. Cl.[4] ............................................. G06K 9/52
[52] U.S. Cl. ...................................... 382/1; 350/130; 356/12; 382/42
[58] Field of Search ...................... 356/2, 12; 250/558; 358/88; 382/1; 350/130; 364/513

[56] References Cited

U.S. PATENT DOCUMENTS 3,597,083 8/1971 Fraser .................................. 250/558
3,901,595 8/1975 Helava et al. ....................... 250/558
3,961,851 6/1976 Gerharz .............................. 356/12

Primary Examiner—Leo H. Boudreau
Assistant Examiner—Jacqueline Todd
Attorney, Agent, or Firm—Oblon, Fisher, Spivak, McClelland & Maier

[57] ABSTRACT

Two-dimensional images of a three-dimensional body photographed by two video cameras are parallactically compensated prior performing the detection of the corresponding point necessary to recognize the body. Namely, the parallax between both cameras for the object distance measured by a range finder is calculated by a parallax calculator, and one image is electrically shifted by an image shifting circuit by only the number of pixels in accordance with the parallax value, thereby performing the parallax compensation of the images. In a calculation processing unit, the correlation values for the corresponding points between both images are calculated, and the distance images of the body are produced on the basis of these correlation values.

8 Claims, 2 Drawing Figures

STEREOSCOPIC VISION SYSTEM

BACKGROUND OF THE INVENTION

The present invention relates in general to a system for recognizing a three-dimensional body and, in more particular, to a stereoscopic vision system for processing images of which a three-dimensional object was two-dimensionally reflected, thereby to obtain the distance information of the object.

Recently, it is one of the important themes of technological development to recognize (scene analyze) a three-dimensional object on the basis of the two-dimensional image processing technique. For example, a binocular stereoscopic-vision unit to be built in an intelligent robot, which can move or run among obstacles so as not to collide with the obstacles, extracts distance information (distance image) necessary to sense and recognize the three-dimensional obstacles. The use of this distance information enables the size and position of an object to be determined and also enables a particular object to be extracted from several apparently overlapping objects on the two-dimensional image, or it enables the background, which is unnecessary for the object information on the two-dimensional image to be erased.

A stereoscopic vision system is an apparatus which (1) receives images of an object photographed from a plurality of different points of view; (2) performs the corresponding point detection with respect to whether or not the corresponding portion, which is the same portion on the actual object, exists among those images and, if it exists, finds out which portion it is; and (3) measures the actual distance between the stereoscopic vision system itself and the object in accordance with the principles of a triangulation method on the basis of the relative relation among the above-mentioned corresponding points thus discovered and the above-mentioned points of view. This system has two video cameras corresponding to the eyes of a man. A computer system is provided to perform the corresponding point detection in the images from the cameras. However, according to conventional stereoscopic vision systems, the comparison processes must be respectively performed among a number of arbitrary pixels of both images to discover the corresponding points between the two images. Therefore, the number of calculation processes, which the computer system for the stereoscopic vision system must execute, becomes enormous and takes a long time until the corresponding points are discovered. In the worst case, the suitable corresponding points cannot be correctly discovered. Consequently, a large computer system is needed, but this causes the hardware constitution of the stereoscopic vision system to be adversely complicated and reduces the practicality of the system.

SUMMARY OF THE INVENTION

It is an object of the present invention to provide a new and improved stereoscopic vision system which can quickly extract distance information of a three-dimensional object by means of a simple hardware constitution on the basis of the two-dimensional image information of the object.

A stereoscopic vision system of the present invention has image input devices which simultaneously photograph a three-dimensional object from mutually different view points to produce electrical image signals representing a plurality of two-dimensional images of the same body. The first operating section receives predetermined object distance data and calculates the parallaxes of the body images to the predetermined object distances. After the parallax correction among the body images is performed in accordance with the parallax values thus calculated, the correlation or similarity among the corresponding portions of these images is quantitatively computed by a second operating section. The body information regarding the predetermined object distances is extracted by a third operation section in accordance with the correlation values thus computed, thereby obtaining the depth map (or range data image) of the object.

BRIEF DESCRIPTION OF THE DRAWINGS

The present invention is best understood by reference to the accompanying drawings, in which.

DETAILED DESCRIPTION OF THE PREFERRED EMBODIMENT

Figure 1:
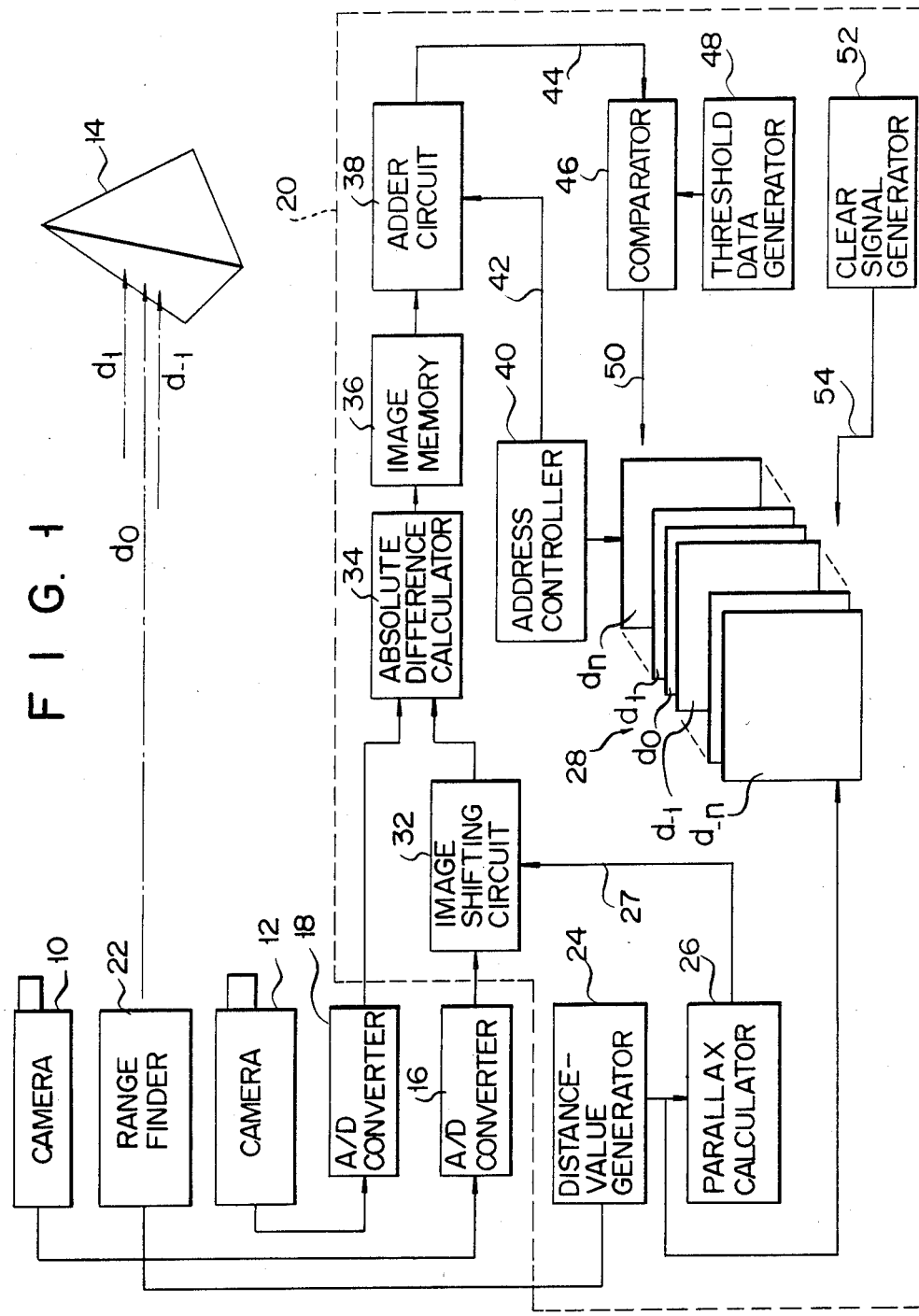
FIG. 1 is a block diagram schematically illustrating the whole structure of a stereoscopic vision system as an embodiment of the present invention.

In a stereoscopic vision system as one embodiment of the present invention shown in FIG. 1, there are provided video cameras 10 and 12 for photographing an object to be measured 14. The cameras 10 and 12 function as the image input units. The cameras 10 and 12 are disposed so as to mutually keep the same height from a predetermined reference surface, e.g., the floor or ground surface and, at the same time, they are positioned at the locations as a constant distance in such a manner that their image pickup optical axes become parallel. Therefore, the two-dimensional images of the body or object 14 to be obtained from the different points of view are inputted to the cameras 10 and 12. The TV cameras 10 and 12 are connected through analog-to-digital converters or A/D converters 16 and 18, respectively, to an arithmetic processing unit 20 which is constituted by a microcomputer. Therefore, after the images of the object 14 output from the cameras 10 and 12 were converted into the digital codes by the A/D converters 16 and 18, respectively, they are supplied to the arithmetic processing unit 20.

A distance measuring apparatus, i.e., range finder 22 for measuring the distance using the radiation such as infrared rays, laser beam, or ultrasonic wave, etc., is arranged between the video cameras 10 and 12. Preferably, the range finder 22 is fixed at the central location between the cameras 10 and 12. The range finder 22 measures schematic distances $d_0$ from the cameras 10 and 12 to an appropriate point on the object 14. The measurement data to be output from the range finder 22 is supplied to a distance-value generator circuit 24 provided in the arithmetic processing unit 20.

In the arithmetic processing unit 20, the distance-value generator 24 is connected to a parallax calculator 26 and an image memory 28. In FIG. 1, the image memory 28 is diagrammatically illustrated so as to clearly show the state in which a plurality of memory planes (image frames) are stored. The distance-value generator 24 produces a plurality of distance data strings $d_i$ ($i = -n, \ldots, -2, -1, 0, 1, 2, \ldots, n$; n is a positive integer) between the range finder 22 and the surface of the object 14 in a proper range, where the distance line corresponding to the reference distance $d_0$ is used as the center line. These distance data strings $d_i$ are sent to the image memory 28 and are stored therein, at the same time, they are supplied to the parallax calculator 26. The circuit 26 calculates the parallax between the video cameras 10 and 12 with respect to each data of the object distance data $d_i$, which were set as mentioned above. It should be noted that although the parallax calculating method differs depending upon the optical conditions set for the cameras 10 and 12, according to the above embodiment, the parallax of the cameras 10 and 12 for the object 14 is caused in only a single direction, i.e., the horizontal direction in the horizontal plane which includes a predetermined surface point of the object 14 and the two TV cameras 10 and 12, since the two cameras 10 and 12 are disposed in parallel with each other at the same height as mentioned previously.

Figure 2:
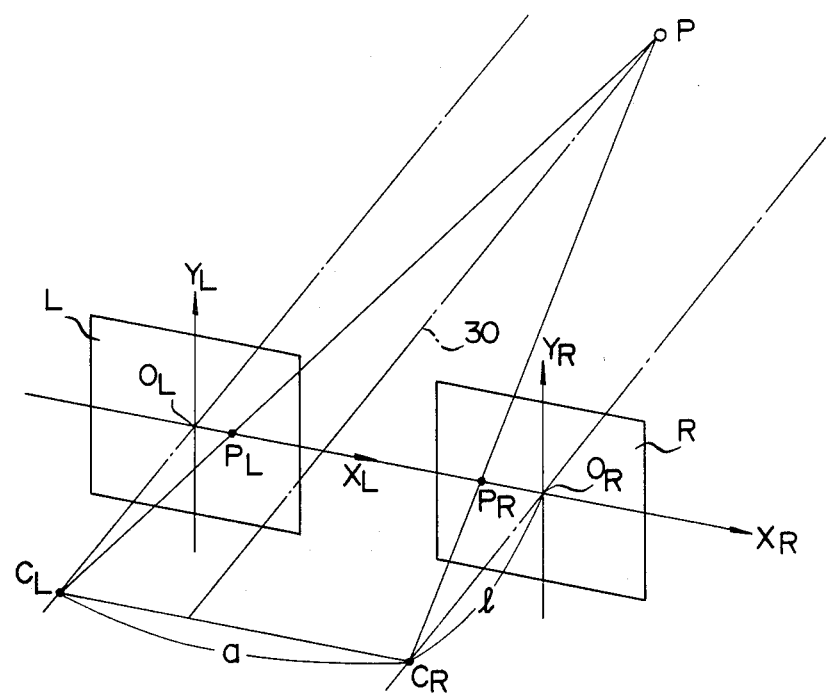
FIG. 2 is a diagram which shows the relations among the parallaxes to be calculated by a parallax calculator included in the stereoscopic vision system of FIG. 1, namely, the object distances and the camera parallaxes.

FIG. 2 diagrammatically illustrates the quantitative relations among the parallaxes to be calculated by the parallax calculator 26, i.e., the object distances $d_i$ and the camera parallaxes. In FIG. 2, P denotes a point on the surface of the object 14. When the distance between the centers $C_L$ and $C_R$ of the lenses of the two cameras 10 and 12 for photographing the object 14 from different points of view is represented by a sign "a", the two-dimensional image forming planes of the object 14 to be formed through the lenses are formed at positions of only a focal distance l from the center $C_L$ and $C_R$ of the lenses. The optical images of the object 14 are formed behind the lenses as the inverted images (not shown) opposite the object in the vertical and horizontal directions. In this case, the inverted images may be equivalently considered as the erect images L and R to be formed in front of the lenses and at positions a focal distance l from the lenses on the basis of the generally known geometrical property. When specifying the orthogonal coordinate systems $(X_L, Y_L)$ and $(X_R, Y_R)$ using the centers $O_L$ and $O_R$ of the respective erect images L and R as the origins, the praticular relation shown below is satisfied among the image coordinate positions $P_L$ and $P_R$ of the object 14's surface point P located on a line 30, to determine the object distance $d_i$ and the above-mentioned parameters a, l and $d_i$.

$$d_i = a \cdot \frac{l}{X_L - X_R} \quad (1)$$

$$X_L = P_L,$$
$$X_R = P_R$$

wherein, it was presumed in equations (1) that the parallax in the perpendicular direction (i.e., the vertical direction or Y direction) of the cameras 10 and 12, disposed in accordance with the above-described setting condition, does not occur. In equations (1), a variable represented by $(X_L-X_R)$ is the parallax $\Delta x$ between the right and left images to be photographed by the cameras 10 and 12. Therefore, when the distance $d_i$ to the object 14 to be measured is set, the parallax $\Delta x$ between both images at this time can be obtained such that $$\Delta x = a \cdot \frac{l}{d_i} \quad (2)$$

The parallax calculator 26 appropriately calculates the parallax on the basis of the above equation (2); determines the number of pixels included in the distance corresponding to the parallax thus calculated; and generates a control signal 27 to control the image shift operation of an image shifting circuit 32 which is connected to the A/D converter 16 and the parallax calculator 26.

The image shifting circuit 32 shifts one of the two images from the two TV cameras 10 and 12, i.e., the pickup image from the TV camera 10 which was digitally encoded by the A/D converter 16 by only the pixels (bits) to be determined in response to the above-mentioned signal 27, thereby compensating the parallax. This image shifting circuit 32 may be the circuit which compensates the parallax of one of the right and left images or may be the circuit which compensates the parallaxes of both images.

The image which was parallactically compensated in the above-mentioned manner, i.e., the digital image from the video camera 10 through the A/D converter 16 and the image shifting circuit 32, and the digital image from the other video camera 12 through the A/D converter 18 are supplied to an image memory 36 through a differential absolute difference calculator 34 in this embodiment. Every pixel signal of both images which was parallactically compensated is supplied to the circuit 34, which calculates the difference between the corresponding pixels included in the different images. The absolute value of this difference is stored in the image memory 36 corresponding to the pixel location. Therefore, the information representing the differences among the respective pixels, which are included in the right and left images and were parallactically compensated with respect to a certain object distance $d_i$, are sequentially stored in the image memory 36.

The image memory 36 is connected to an adder circuit 38. This adder circuit 38 is the local small area adder circuit for computing the correlation value between the two images under the control of an address control circuit 40. Namely, the adder circuit 38 reads out from the image memory 36 the pixel data in small square areas (partial images) using the respective pixels, included in the parallactically compensated image, as the central points (the pixels are sequentially scanned, for example, from the upper leftmost pixel position to the lower rightmost pixel position in one frame image) in response to an address control signal 42 from the address control circuit 40. The adder circuit 38 computes the sum total of the pixel values included in each small area image. The sum total of the pixel values serves as the correlation value between the above-mentioned two images, corresponding to one central pixel position. An electrical signal 44 representing this correlation value data is supplied to a comparator 46.

The comparator 46 is connected to a threshold value-setting circuit 48 and receives the reference value which was set by this circuit 48, i.e., the correlation threshold value, then it compares this threshold value with the input correlation value. In the comparison processing by the comparator 46, when the correlation value of the images is the threshold value or less, it is discriminated that the correlation between both images at the central pixel position of the local pixel, regarding this correlation value, is strong (namely, the similarity between both images is the strongest). At this time, the comparator 46 supplies a corresponding point detection data 50 to the distance image memory 28. In response to this signal, the above-mentioned corresponding point detection data is written in the pixel location to be processed, which was determined under the control of the address controller 40 in the corresponding memory plane in the memory 28. In addition, a reference numeral 52 designates a clear signal generator 52 for generating a clear signal 54 to clear the stored contents in the distance image memory 28 and to initialize it.

The operation mode of the stereoscopic vision system, as one embodiment of the present invention constituted in such a manner as described above, will be described below. In the case where a three-dimensional body, i.e., the object 14, exists in front of the two cameras 10 and 12 disposed in parallel, an optical image of the body 14 enters in the two cameras 10 and 12, and the schematic distance $d_0$ between this system and one point on the surface of the object 14 is immediately measured by the distance measuring apparatus 22 disposed between the cameras 10 and 12. This distance $d_0$ is set in the distance value generator 24. At the same time, the two-dimensional images photographed by the cameras 10 and 12 are digitally processed by the A/D converters 16 and 18, respectively, and are transferred to the arithmetic processing unit 20.

In the arithmetic processing unit 20, a series of object distance value strings $d_i (= d_{-n}, \ldots, d_{-2}, d_{-1}, d_0, d_1, \ldots, d_n)$, each having a predetermined distance using the fixed distance $d_0$ which was set as the center, are produced. Then, the parallaxes $\Delta x$ between the TV cameras 10 and 12 are computed by the parallax calculator 26 with regard to the object distances among the above-mentioned series of distances. In this embodiment, the parallax calculation is obtained in accordance with the above-mentioned equation (2), since the two cameras 10 and 12 are placed in parallel with each other at the same height. At least one image of both images from the cameras 10 and 12 is electrically parallactic-compensation processed by the image shifting circuit 32 in accordance with the parallax values $\Delta x$ obtained in this way. Subsequently, the circuit 34 computes the differential values among the pixel signals, which are included in both parallactically compensated images, and the absolute values, of which differential values are appropriately stored at the locations of the respective pixels in the image memory 36 at the post stage so that each value corresponds to each pixel location. Therefore, the information representing the differences among the corresponding pixels of the images from both right and left cameras, which were parallactically compensated in regards to an arbitrary object distance $d_i$, are stored in this image memory 36.

Subsequently, according to the unit 20, the pixel data in the local small image areas, using a plurality of pixels as the centers, are sequentially read out from the image memory 36 under the control of the address controller 40. The adder circuit 38 calculates the sum total of the pixel values in each small image area as the correlation value between both images at its central pixel locations. This correlation value is compared with a predetermined threshold value in the comparator 46. Due to this, when the correlation (similarity) between both images at its pixel location is determined to be strong (high), the corresponding point detection data 50 is given to the distance image memory 28. The memory plane, responsive to the particular object distance $d_1$ to be processed, is selected in the memory 28 under the control of the distance value generator 24. The above-mentioned corresponding point detection data is written in the address (which is determined by the address controller 40) corresponding to the pixel location to be processed in the memory plane thus selected. Therefore, when a certain object distance d was set as the distance to be detected and processed by the distance value generator 24, the parallax for this object distance d is computed. Subsequently, the differences among the respective pixels of both right and left images, which were compensated in accordance with this parallax, are calculated and the sum total of the differential values in the local small area, using each pixel location as the center, is obtained as the correlation value between both images in regards to each pixel. The correlation values are compared with the corresponding threshold values, thereby detecting the pixel of which the correlation degree is the strongest, i.e., the corresponding point. The information relating to this corresponding point detection is written in the memory plane, responsive to the particular distance d among a number of memory planes which have been stored in the memory 28. Thus, the information regarding the distance $d_i$ of the object 14 is stored in this memory plane. The above-described processing is sequentially repeated while the set object distance $d_i$ is changed by a predetermined distance $\Delta d$ at a time. Due to this, in the memory 28, the information which relates to the set distances $d_i$, i.e., the distance image (range data image), is obtained. It should be noted that the reason why the addition processing for the local small image area is performed in the above-mentioned corresponding point detection processing is as follows. In the case where the differential value between both images parallactically compensated by the electrical image shifting was obtained, the pixel values of the differential image between both images have the digital value which is approximately equal to zero. Consequently, under such a situation that the digital pixel value is directly compared with a predetermined threshold value by the threshold value-setting circuit 48, the comparison accuracy is reduced due to the undesirably mixed noise component, causing an erroneous discrimination. To improve the accuracy in such comparison processing, the system is constituted so that the adding operation for the local small image area is executed by the adder circuit 38 in such a manner as described above.

According to the relevant stereoscopic vision system, the corresponding points among object images, which were photographed from a plurality of different points of view, can be detected at high speed. This is because the object distance $d_i$ is first measured by the range finder 22 and then this distance $d_i$ is used as the particular distance for the above object image, and the parallax compensation is executed for this particular distance $d_i$ prior to the corresponding point detecting operation. Therefore, the arithmetic processing required for the corresponding point detection is more simplified as compared with the conventional corresponding point detection, thus allowing the detection speed to be improved. The information about the object, i.e., the distance image with respect to the above-mentioned particular object distance $d_i$, can be obtained at high speed on the basis of the correlation value between the corresponding point image areas in both images detected in this way. Furthermore, since the calculation processing ability required for the computer unit may be smaller than the conventional one, the hardware constitution needed for the stereoscopic vision processing can be remarkably simplified. This face largely contributes even to the miniaturization of the stereoscopic vision system, and it is further possible that the system is widely applied to the expanded technical fields including, for example, a scene analysis unit for automatic running robots, or an object body recognition unit for various industrial working robots, etc.

Although the present invention has been shown and described with respect to a particular embodiment, various changes and modifications which are obvious to a person skilled in the art to which the invention pertains are deemed to lie within the spirit and scope of the invention.

For example, it is not always necessary to utilize the range finder 22 provided in the above embodiment to actually measure the object distance $d_0$. This is because the setting of the particular distance $d_0$ in the present invention is not limited to only the actual measured value. For instance, a plurality of object distances may be fixedly preset in the distance-value generator 24 so as to have predetermined, relatively rough distances. If one object distance, where it was confirmed that the three-dimensional body or object 14 exists, is selected among the object distance data, the system may be modified in such a manner as to set the above-mentioned distance data string $d_i$ at a proper distance, for example, at about the distance value previously mentioned, as the center.

Furthermore, a weight-addition processing function may also be added to the function for calculating the sum of the differential absolute values between two images in the small local area, where the adding function is executed by the adder circuit 38 to calculate the correlation value in the above embodiment. In this case, if a predetermined weight is added to the central portion of each image upon addition processing of the local area, it will be expected that reliability of the correlation value to be calculated can be improved. The addition algorithm in the adder circuit 38 may be variously modified. For instance, although the amount of calculations will be increased, if the correlation coefficient is obtained and is used as a correlation value, it is also possible to obtain the normalized correlation value which is not influenced by a density of an image. In addition, although the sum total of the differences in the small local area has been obtained and compared with the threshold value in the embodiment, if the comparison with the threshold value is performed in parallel with the addition processing and when the addition value exceeds the threshold value, it its addition processing is stopped halfway, the necessary time for processing can be shortened. This is called an SSDA (Sequential Similarity Detection Algorithm) in the image processing and is effective to reduce the number of additions and raise the processing speed.

In addition, it may be possible to select the maximal value portion of the correlation value through a space filter after the calculation of the correlation value, thereby removing the noise component. That is, the correlation for the object on the set distance strengthens due to its parallax compensation, while the correlation becomes weak as the object departs from the above-mentioned set distance; therefore, if this method is effectively utilized, distance images can be accurately obtained.

On the other hand, although the existence of a body has been discriminated by using two values and comparing the correlation value with the threshold value in this embodiment, it may be possible to divide the threshold value into the multistep values to obtain the probable existence of a body. Also, the threshold value may be given as a function of the mean value at the corresponding portions of the densities of both right and left images. Due to this, it is possible to accurately extract distance images while reducing an adverse influence to the differential value to be caused by a difference in density of the original image.

Furthermore, in the pixel location where the existance of a body was detected, the information relating to its distance $d_i$ may be written without preparing the distance picture-image memory planes for every set distance. In this case, it is preferable to encode the information regarding the distance and add it. On the other hand, at this time, if the correlation value from whch this detection result was obtained in addition to the above-mentioned information, relative to the distance, are recorded, a further high grade image processing will be possible. In other words, when the existence of a body was detected at the same location with regard to the different set distances or in other cases, it is possible to discriminate the degree of reliability between two correlation values by comparing them, thereby enabling higher grade distance images to be obtained.

What is claimed is:

1. A stereoscopic vision apparatus for extracting, from the entire image of a three-dimensional scene, at least one partial image with respect to a predetermined reference distance, and recognizing, on the basis of two-dimensional image processing, whether or not an object actually exists apart from said apparatus by the reference distance in a certain direction, thereby automatically performing a scene analysis, said apparatus comprising:

(a) image input means for simultaneously sensing an incoming image light of a three-dimensional objective body from different points of view and for producing first image signals representing a plurality of two-dimensional body images for the same objective body;
   (b) first operating means for receiving distance value data designating the reference distance and for calculating the parallax for the reference distance of said plurality of body images to produce parallax value data;
   (c) parallax compensating circuit means, connected to said image input means and said first operating means, for compensating at least one of the first image signals so as to effect a geometric transformation of said body images in accordance with said parallax value data, and for generating second image signals representing a geometrically compensated body image corresponding to said reference distance; and
   (d) distance image generating means, connected to said parallax compensating circuit means, for generating a distance image of the three-dimensional objective body corresponding to said reference distance, each pixel of the distance image indicating information about the three-dimensional objective body portion which is apart from said image input means by substantially said reference distance, and said distance image generating means including,
   second operating means, connected to said parallax compensating circuit means, for calculating correlation values, from at least said second image signals, among mutually corresponding image portions of the body images, and for producing a sequence of said correlation values as third image signals; and third operating means, connected to said second operating means, for extracting, from said third image signals, signals which satisfy a predetermined condition about said correlation values, thereby obtaining said distance image of said three-dimensional objective body.

2. The apparatus according to claim 1, further comprising:

distance detecting means, provided in parallel with said image input means, for detecting the schematic distance between said apparatus and said three-dimensional body and for outputting object distance data; and distance setting means, connected between said distance detecting means and said first operating means, for producing said reference distance data on the basis of said object distance data.

3. The apparatus according to claim 2, wherein said image input means includes:

a pair of electric camera units which are fixed so as to keep substantially the mutually same height from a surface on which said apparatus is placed and to keep a predetermined distance therebetween, and which photograph said three-dimensional body to produce analog image signals; and signal converter means connected to said electric camera units, for converting said analog image signals into the digital image signals.

4. The apparatus according to claim 3, wherein said first operating means specifies the number of pixels of said digital images responsive to said parallax values calculated; and said parallax compensating circuit electrically shifts at least one body image among said plurality of body images in dependence upon said number of pixels.

5. An image processing apparatus for extracting distance images representing whether or not an objective body is actually existed at a predetermined reference distance from said apparatus, thereby automatically recognizing a scene containing a stereo body, comprising:

(a) a pair of image pickup devices which are disposed away from each other so as to photograph one body from mutually different points of view and produce two electrical image signals respectively representing two two-dimensional body images for one body;

(b) distance measuring means, fixedly positioned between said image pickup devices, for measuring an object distance to an arbitrary point on the surface of said one body and for determining the reference distance; and (c) computer means, connected to said image pickup devices and said distance measuring means, for processing said two-dimensional image signals and extracting said distance images, said computer means comprising, first circuit means, connected to said distance measuring means, for producing an object distance string, including the reference distance as the center and a plurality of object distances adjacent to the reference distance at predetermined intervals, image memory means having memory planes which correspond to said object distance string, second circuit means, connected to said first circuit means, for calculating the parallax between said pair of image pickup devices with respect to at least one object distance in said distance string and for producing parallax values, third circuit means connected to said second circuit means, for electrically performing the parallax compensation between the corresponding output image from said image pickup devices in a manner such that at least one of said output images is geometrically reformed in accordance with said parallax values to thereby compensate the parallactical difference between said output images, and fourth circuit means, connected to said third circuit means, for obtaining correlation values in each image area of both of said parallax-compensated images and for detecting the corresponding point between both of said images using these correlation values, said data of said corresponding point thus detected being stored in the corresponding image plane in said image memory means.

6. The apparatus according to claim 5, wherein said fourth circuit means includes:

difference-calculation circuit means for calculating the differences in data among the pixels which are included in the output images from said pair of image pickup devices; and adder circuit means for receiving the difference data of said difference-calculation circuit means and for calculating the sum total of said pixel difference data included in the image portion areas which are formed using each pixel of each of said output images as the center.

7. The apparatus according to claim 6, wherein said sum total serves as the correlation value data between both of said images at the corresponding pixel location.

8. The apparatus according to claim 7, wherein said fourth circuit means further includes:

comparator means, connected to said adder circuit means and said image memory means, for receiving threshold value data and comparing the correlation value data between both of said images with this threshold value data, thereby searching said corresponding point.

* * * * *